United States Patent
Kreuz et al.

(10) Patent No.: US 11,301,801 B1
(45) Date of Patent: Apr. 12, 2022

(54) CROSS-ACCOUNT RATING SYSTEM

(71) Applicant: POPOUT, INC., San Francisco, CA (US)

(72) Inventors: Simon Kreuz, San Francisco, CA (US); Subhi Beidas, San Francisco, CA (US); Lucas Amaral Cunha de Assis, San Francisco, CA (US); Wissam Jarjoui, San Francisco, CA (US)

(73) Assignee: POPOUT, INC., San Francisco, CA (US)

( * ) Notice: Subject to any disclaimer, the term of this patent is extended or adjusted under 35 U.S.C. 154(b) by 64 days.

(21) Appl. No.: 15/424,776

(22) Filed: Feb. 3, 2017

(51) Int. Cl.
*G06Q 10/08* (2012.01)

(52) U.S. Cl.
CPC .............................. *G06Q 10/08345* (2013.01)

(58) Field of Classification Search
CPC ............ G06Q 10/08345; G06F 16/335; G06F 16/8373; G06F 16/24557
USPC ........................................................ 705/335
See application file for complete search history.

(56) References Cited

U.S. PATENT DOCUMENTS

| | | | | |
|---|---|---|---|---|
| 7,660,006 B2 * | 2/2010 | Taskett | ................... | G06Q 10/08 358/1.15 |
| 7,818,267 B1 * | 10/2010 | Bilibin | .................. | G06Q 10/063 705/335 |
| 8,725,656 B1 * | 5/2014 | Gill | ...................... | G06Q 10/101 705/335 |
| 2004/0212833 A1 * | 10/2004 | Taskett | ................... | G06Q 10/08 358/1.18 |
| 2004/0249699 A1 | 12/2004 | Laurent | | |
| 2006/0004675 A1 | 1/2006 | Bennett | | |
| 2010/0114784 A1 | 5/2010 | Sandholm | | |
| 2011/0071954 A1 | 3/2011 | McCall | | |
| 2013/0096989 A1 * | 4/2013 | Dale | ...................... | G06Q 10/08 705/7.34 |
| 2014/0172735 A1 | 6/2014 | Jena | | |
| 2014/0188754 A1 | 7/2014 | Viswanath | | |
| 2014/0279657 A1 * | 9/2014 | Stowe | .............. | G06Q 10/08345 705/335 |
| 2015/0046198 A1 * | 2/2015 | Daniel | ................... | G06Q 10/02 705/5 |
| 2015/0339738 A1 | 11/2015 | Munaswamy | | |
| 2015/0371318 A1 | 12/2015 | Hen | | |
| 2017/0061376 A1 * | 3/2017 | Wagner | .............. | G06Q 10/0838 |

(Continued)

FOREIGN PATENT DOCUMENTS

| | | | | |
|---|---|---|---|---|
| WO | WO-2013166368 A1 * | 11/2013 | ............. | G06T 17/20 |
| WO | 2014210550 | 12/2014 | | |

OTHER PUBLICATIONS

Ampuja, Jack. "FreightComms: Dimensional Weight: Driving Less-Then-Truckload rates higher in USA". 2019 (Year: 2019).*

(Continued)

*Primary Examiner* — George Chen
*Assistant Examiner* — Lisa Ma
(74) *Attorney, Agent, or Firm* — Van Pelt, Yi & James LLP

(57) ABSTRACT

A request is received to provide shipping rate information to ship a package from a source location to a destination location. A plurality of accounts with one or more third-party carriers are searched across to determine a set of shipping rates to ship the package. A quoted set of shipping rates is determined from the set of shipping rates to be returned in response to the request.

17 Claims, 8 Drawing Sheets

(56) References Cited

U.S. PATENT DOCUMENTS

2017/0286894 A1* 10/2017 Bennett .................. G06Q 30/04
2019/0213538 A1    7/2019 Bebout

OTHER PUBLICATIONS

David Austin. "Pricing Freight Transport to Account for External Costs". https://www.researchgate.net/profile/David-Austin-6/publication/277301662_Pricing_Freight_Transport_to_Account_for_External_Costs/links/5566053208aeccd777359dba/Pricing-Freight-Transport-to-Account-for-External-Costs. (Year: 2015).

* cited by examiner

FIG. 4

CROSS-ACCOUNT RATING SYSTEM

BACKGROUND OF THE INVENTION

The internet facilitates business transactions with the use of e-commerce and non e-commerce (for example, donations or gifts) sites for retail consumers and other businesses to browse. For the sale of physical products, shipping expediency and costs are a component of the sale individualized to the particular customer of the e-commerce site.

Each customer may have different shipping needs for a physical product that require flexibility on behalf of the e-commerce site. This flexibility is a challenge for a given carrier's site usability, application programming interface (API) and server speed.

BRIEF DESCRIPTION OF THE DRAWINGS

Various embodiments of the invention are disclosed in the following detailed description and the accompanying drawings.

FIG. 4 is an illustration of an embodiment for a local projection of a third-party carrier rating.

DETAILED DESCRIPTION

Figure 1:
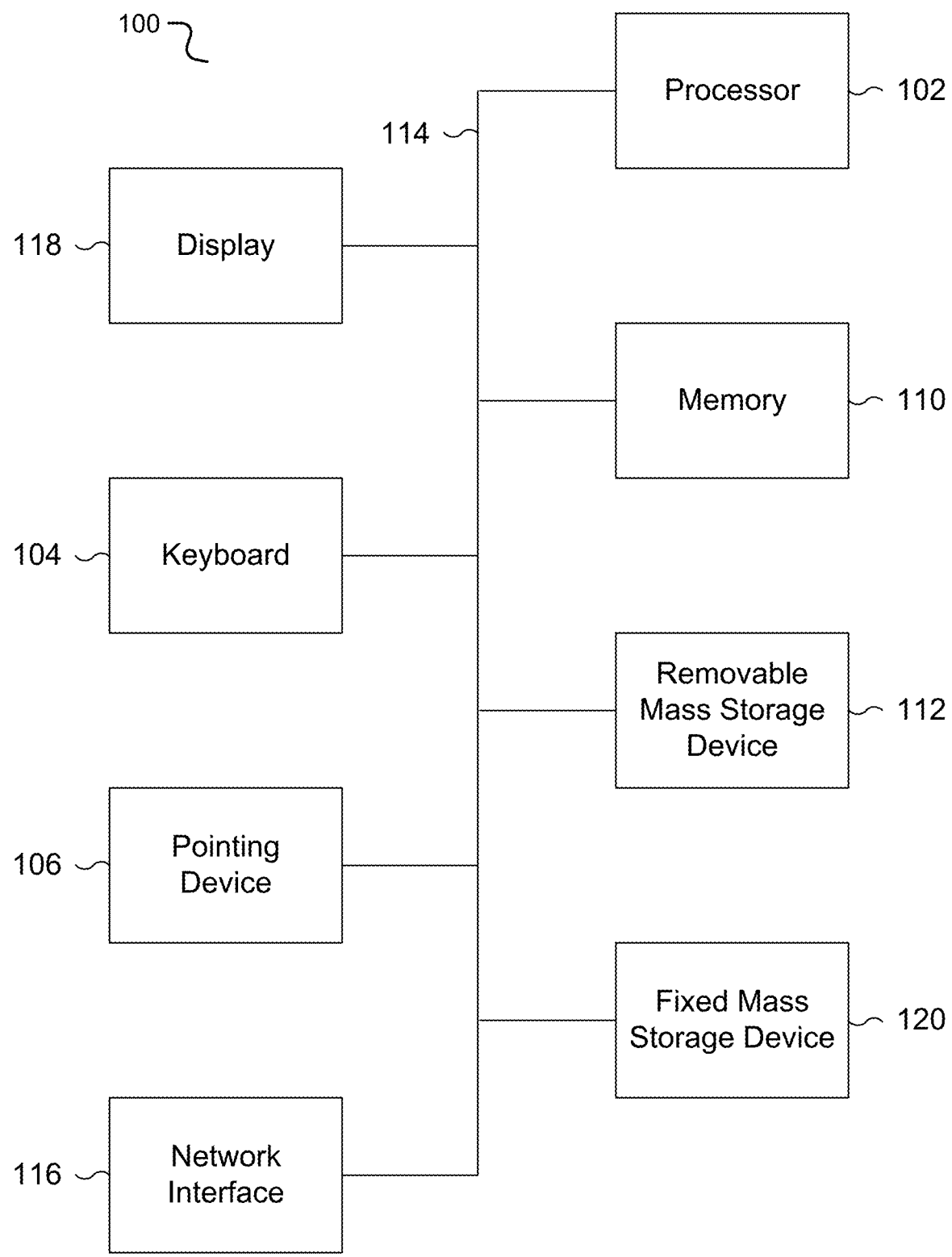
FIG. 1 is a functional diagram illustrating a programmed computer/server system for multicarrier rating and/or shipping optimization in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A multicarrier server and associated API is disclosed. In one embodiment, the multicarrier server uses a set of third-party APIs for third-party carriers to establish and update shipping rates, including shipping service levels and shipping costs. In one embodiment, the associated API provides an e-commerce site, such as that associated with a small business, with a simple-to-use interface to a plurality of third-party carriers and/or a plurality of rate classes from one or more third-party carriers. Third-party carrier APIs may be cumbersome or complex as they may support legacy interfaces and/or interfaces suitable for all scales of enterprise. A simple-to-use API that 'wraps' around third-party APIs and is accessible using modern frameworks such as node.js and Go reduces development costs and errors in execution.

Using a local database to establish shipping rates for third-party carriers with an asynchronous update is disclosed. Using a local database may improve performance of an e-commerce site by providing a robust and fast local server. In one embodiment, the local database is used for a work shift, for example a work day, and asynchronously after the end of the work shift a transactions file and/or flat file is uploaded to the third-party carrier. In one embodiment, the third-party carrier will honor prices as established locally during the work shift by the multicarrier site and/or reconcile any differences financially.

Using a multicarrier approach, efficiencies for customers of the e-commerce site, thus improving their customer satisfaction, may be found in two ways. First, a multicarrier approach allows shopping of different third-party carriers given shipping constraints of a customer including service level and/or shipping deadlines, and shipping costs. Second, even within a single carrier, shopping of different rate classes, for example by package weight vs zone ("WZ") pricing, and by package cubic size vs zone ("Cubic") pricing, may provide efficiencies and arbitrage for a given customer.

In one embodiment, a technique includes the steps of: 1) a user describing shipping dimensions, for example package dimensions, source and destination locations and/or zones, and/or weight, and a subsequent look up of applicable values in one or more rate charts; 2) repeating step 1 for at least a subset of all available carriers and services; and/or 3) the user picking the most suitable or better service out of results, and/or changing the shipping dimensions.

FIG. 1 is a functional diagram illustrating a programmed computer/server system for multicarrier rating and/or shipping optimization in accordance with some embodiments. As shown, FIG. 1 provides a functional diagram of a general purpose computer system programmed to provide shipping optimization in accordance with some embodiments. As will be apparent, other computer system architectures and configurations can be used for shipping optimization.

Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors or by virtual processors. In some embodiments, processor 102 is a general purpose digital processor that controls the operation of the computer system 100. Using instructions retrieved from memory 110, the processor 102 controls the reception and manipulation of input data, and the output of data on output devices, for example network interface 116 or storage 120.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 can also include computer-readable media such as flash memory, portable mass storage devices, holographic storage devices, magnetic devices, magneto-optical devices, optical devices, and other storage devices. A fixed mass storage 120 can also, for example, provide additional data storage capacity. The most common example of mass storage 120 is an eMMC device. In one embodiment, mass storage 120 is a solid-state drive connected by a bus 114. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

The communication interface 116 allows processor 102 to be coupled to another computer, computer network, or telecommunications network using a network connection as shown. For example, through the communication interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through communication interface 116.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized, including virtual servers.

Figure 2A:
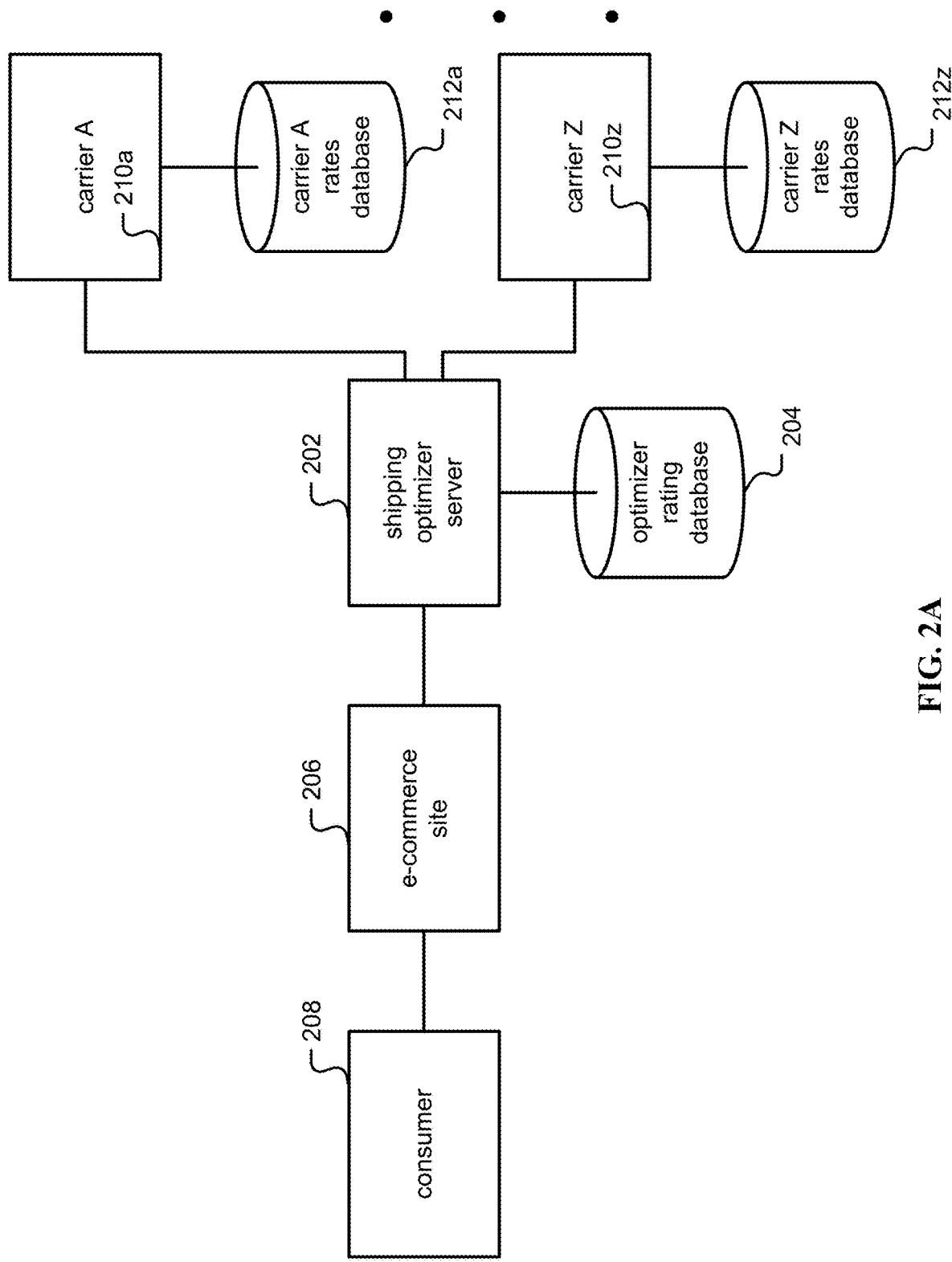
FIG. 2A is a block diagram illustrating an embodiment of a system for multicarrier service.

FIG. 2A is a block diagram illustrating an embodiment of a system for multicarrier service. In one embodiment, the system of FIG. 1 is the shipping optimizer server (202) of FIG. 2A.

Shipping optimizer server (202) is coupled to an optimizer rating database (204), and to third-party carrier servers (210) and their respective rating databases (212), shown in FIG. 2A for a plurality of third-party carrier servers (210*a*, 212*a*) through (210*z*, 212*z*). The optimizer rating database (204) stores a projection of one or more third-party carrier ratings databases (212). Throughout this specification a 'projection' is a representation of a third-party carrier rating database (212) suitable for estimating a rate cost for a shipment given one or more details of the shipment.

In one embodiment, a third-party carrier's rates are stored in database (204) as a 'rate sheet' that determines a rate cost given at least one of the following details of a shipment: a source location; a destination location; a service level, for example service speed or service type; a shipment's dimensions, for example length, width, and/or height, and/or a function of one or more of these dimensions; a shipment's cubic volume; and a shipment's weight. In one embodiment, carriers offer carrier-provided packaging, for example USPS Priority Mail boxes. A customer may use a carrier-provided package and indicate this, for example by way of a token, for example if a user uses the USPS Priority Mail Box A, they indicate "USPS_PriorityMailBoxA". In one embodiment, a third-party carrier's rate sheet determines a rate cost invariant to one or more of the items in the preceding list, for example is invariant no matter what the shipment's dimensions are, or invariant no matter what the shipment's weight is.

In one embodiment, the optimizer rating database (204) is configured to accept efficient queries for the shipping optimizer server (202) in order to retrieve a list of prioritized shipping options. In one embodiment, the optimizer server (202) performs a look up from a locally stored data structure, for example in optimizer rating database (204). In one embodiment, the optimizer server (202) performs a further computation, for example to determine, compare, and/or normalize a shipping rate from the local database (204). In one embodiment, the optimizer server (202) applies one or more third-party carrier-specific rules.

In one embodiment, the optimizer rating database (204) is configured to associate, for a given user, one or more third-party carrier accounts. In one embodiment, for a given user and a given third-party carrier such as the USPS, there may be a plurality of accounts, for example two accounts: a user's USPS account, and a USPS account associated with the server (202). Through economies of scale, such a server account may provide greater savings to a user even with a markup or margin applied by the server (202) to the user (206)/(208). Throughout this specification, reducing cost for a user (206)/(208) may be interchanged conceptually with increasing margin for a server (202).

In one embodiment, the optimizer rating database (204) is structured to associate a user with one or more "rate tier"s, wherein each rate tier is associated with one or more rate tables. In one embodiment, one or more rate tiers are associated with a user. In one embodiment, a rate tier is associated with a carrier account, such that a user may have one or more rate tiers, but the technical relation is between the rate tier and the carrier account, thus the carrier account is linked to the user, and the tier remains being linked to the user, in some cases indirectly.

In one embodiment, the tier is ordered hierarchically, for example a view of part of a tier system may include:

HN Network Tier (Entry Level)
    SL Group Tier CBP
    SL Group Tier CPP
    SL Group Tier CPP+2.5
    SL Group Tier CPP+3.5
    TG Group Tier
        M Customer Tier
        OS Discount Tier
    RN Group Tier When a lower-level tier, for example M Customer Tier, is assigned to a user, this tier may inherit from the higher level tier, for example TG Group Tier. In one embodiment, if the lower level tier in a certain carrier/service combination does not exist, the higher-level tier(s) are available as fallback for the certain combination if available. This makes the system more scalable and easier to maintain, by reducing duplication and complexity.

Figure 2B:
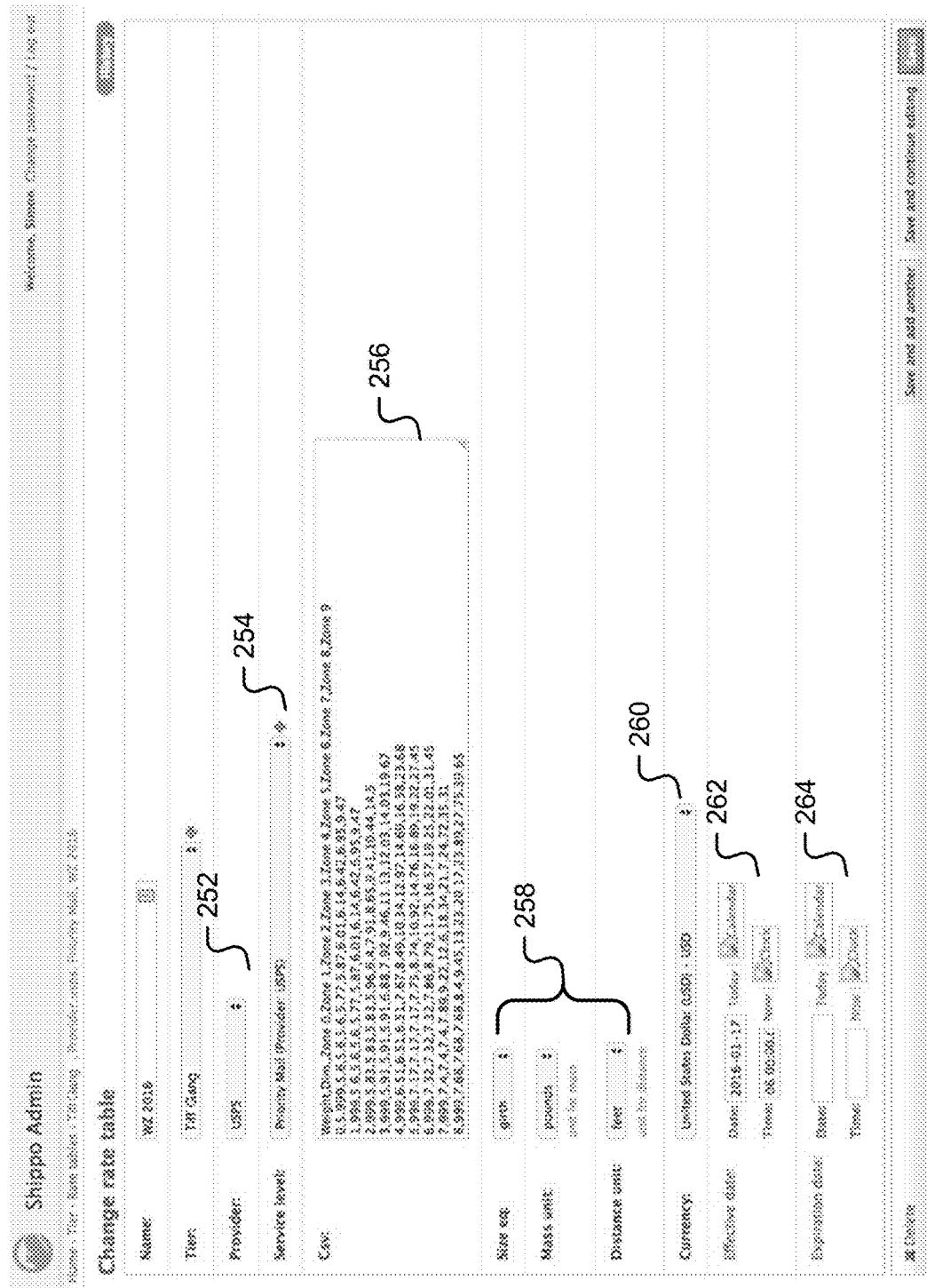
FIG. 2B is an illustration of an administrative view for rate charts.

Each tier then has a set of rate charts. An administrative view might be as follows, with the struck through rate charts being overwritten by rate charts provided for this specific tier (called "TG Group Tier" in this example), whereas the rate charts underlined are the ones inherited from the higher level tier (called "HN Network Tier" in this example):

HN Network Tier→Tiff Gang, Routed Delivery, Fees
HN Network Tier→TG Group Tier, USPS, Priority Mail, WZ
HN Network Tier→TG Group Tier, USPS, Priority Mail, WZ 2016
HN Network Tier→TG Group Tier, USPS, Priority Mail, HC
HN Network Tier→TG Group Tier, USPS, Priority Mail, HC 2016
TG Group Tier, USPS, Priority Mail Cubic
HN Network Tier (Entry Level), USPS, Priority Mail, Regional Rate
HN Network Tier (Entry Level), USPS, Priority Mail Express, Priority Mail Express
HN Network Tier (Entry Level), USPS, Priority Mail Express, PME Flat Rate FIG. 2B is an illustration of an administrative view for rate charts. In one embodiment, a rate table is associated with a rate tier. A rate table may be associated with:
- a third-party carrier (252), such as USPS, UPS, FedEx, DHL, etc;
- a service level (254) of the third-party carrier, such as at least one of the following: Overnight; $2^{nd}$ Day Air; $2^{nd}$ Day Air Saver; and Ground;
- a set of rates (256) for the service level of the third-party carrier, comprising indices (258) based on weight, physical dimension, carrier-provided packaging tokens, and/or shipping zones (for example in CSV, comma-separated values, format);
- currency (260);
- an optional set of service addenda (not shown in FIG. 2B) of the third-party carrier, including at least one of the following: signature confirmation; Saturday delivery; and RMA association;
- an optional effective date (262) for the rate table;
- an optional expiration date (264) for the rate table; and
- an optional set of third-party carrier specific rules (not shown in FIG. 2B), such as a rule regarding the physical dimension index, a rule regarding the shipping zones index, a service applicability rule (for example USPS First Class may only be available for packages less than one pound); and a server rule (for example choosing a server account for packages less than or equal to five pounds, and choosing a user account for packages more than five pounds.)

In one embodiment, available rate tiers for a given user may be based on, for example, a sales volume requirement. A few, for example three to five, standard rate tiers may be available for a general user depending on volume, and custom rate tiers may be available for higher volume users. A rate tier may include default accounts and/or default third-party carriers, for example UPS, USPS, FedEx, and DHL, for new users to default to upon sign up. An example of a rate tier may include a rate table for USPS First Class, a rate table for USPS Priority under a user's account, a rate table for USPS Priority under the server's account, and a rate table for DHL. In one embodiment, the set of rates may be stored in a comma separated values (CSV) file.

Other use cases for tiers include: i) A user has their own rates with one or many carriers and wants the instant technique to provide rating. A reason could be because the carrier is not capable of doing the rating for this customer. In this case a custom tier may be created for this user and would only be used for this user; and ii) A partner, e.g. a platform such as an online auction site, has negotiated rates with e.g. USPS, UPS and FedEx. They want the instant technique to provide rating and labels for their merchants. A custom "auction" tier for each negotiated auction client carrier account is stored.

Shipping optimizer server (202) is coupled to e-commerce site (206) by way of an associated API. As discussed prior, this associated API is a simple-to-use API that 'wraps' around third-party APIs and is accessible using modern frameworks. The consumer (208) is coupled to e-commerce site (206) by way of a browser, mobile app, and/or application. The consumer (208) may not be aware of the shipping optimizer server (202), as they see the e-commerce site (206) and when getting to the 'shopping cart' phase of purchasing, sees an estimate for shipping.

In one embodiment, a series of options are presented to the consumer that show service levels as a function of shipping costs across third-party carriers, for example <2-day Air UPS $13.23; 2-day Air FedEx $15.12; USPS Priority Overnight $19.21>. In one embodiment, a series of options are presented to the consumer that show different services even from one third-party carrier, for example <USPS Priority Overnight $19.21; USPS First Class Mail $25.23>. In one embodiment, no options are presented to the consumer as the optimizer server (202) chooses the option of least cost to a user (206)/(208) and/or higher margin to the server (202) including its markup, given constraints from the user and simply presents the final choice to proceed or to select, for example <Shipping $13.23>, or <Shipping (UPS 2-day) $13.23>.

Figure 3A:
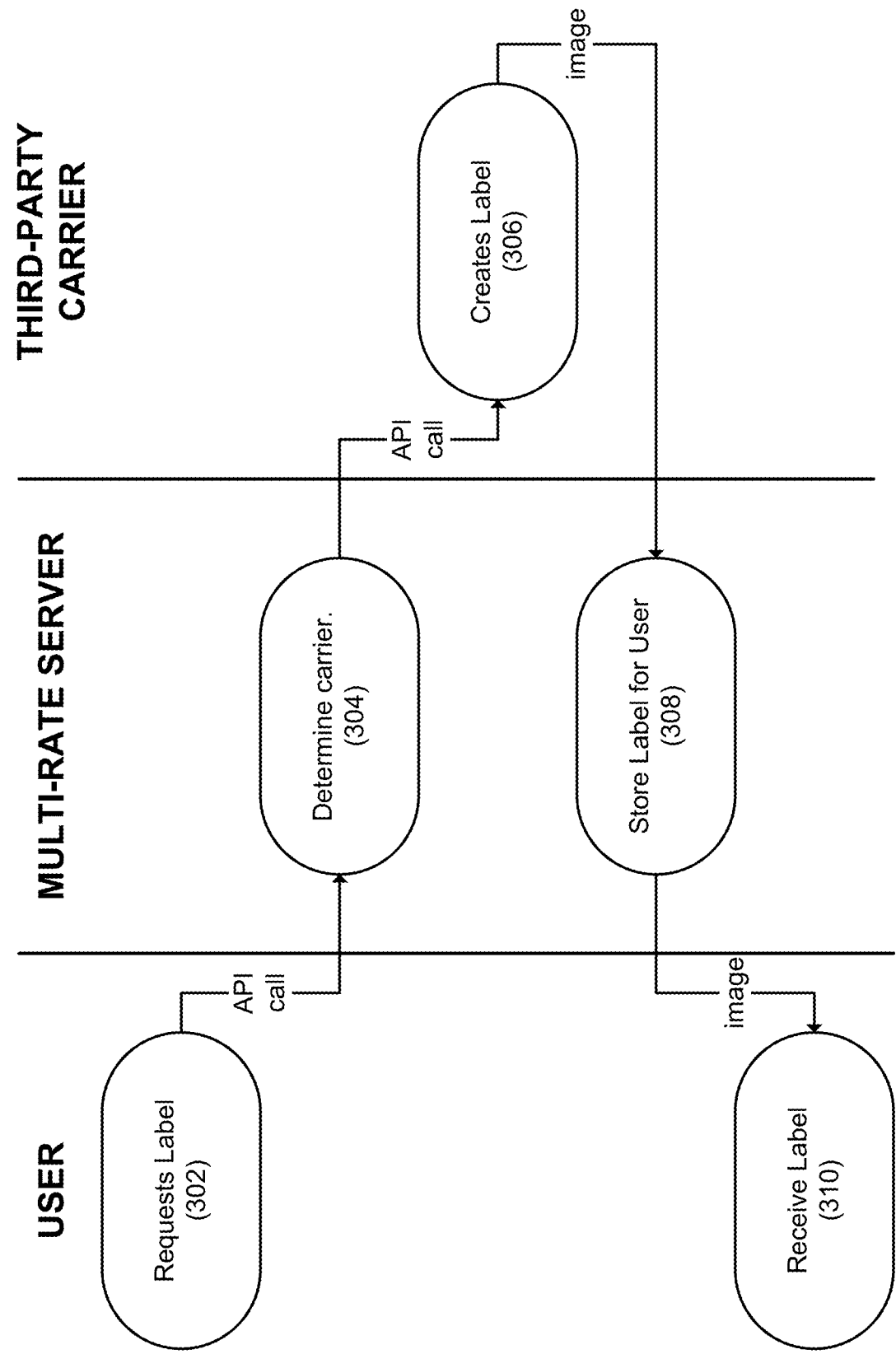
FIG. 3A is an illustration of an embodiment for an endpoint workflow for a user.

FIG. 3A is an illustration of an embodiment for an endpoint workflow for a user. In one embodiment, the workflow of FIG. 3A is orchestrated by shipping optimizer server (202) of FIG. 2A. What is meant by an 'endpoint' workflow is that the endpoint is the third-party carrier database (212) rather than a projection of the third-party carrier rates on a local database (204).

In stage (302), the user, being consumer (208) and/or e-commerce site (206), requests a label for a shipment, and the request is embodied in, for example an API call. In stage (304), the shipping optimizer server (202) determines a third-party carrier (210) for the shipment. In one embodiment, the determination is based at least in part on:

A look up of available third-party carrier accounts for the user;
An assessment of one or more available rate tiers for the user;
For each rate tier available for the user, retrieving the rates for each rate table in each available rate tier, if applicable based on third-party carrier specific rules.

For FIG. 3A, the rate table may be found at third-party carrier database (212) via an API call for each service for each third-party carrier account. In one embodiment, if the rate table is not available or too slow to retrieve from the third-party carrier over a network, a local projection (204) may be used as a fallback.

For example, if a user has a rate tier that includes four rate tables: USPS First Class (user's account); USPS Priority Mail (user's account); DHL (user's account); and USPS Priority Mail (server's account), then four different rate retrieval processing jobs are commissioned for a shipment. In the event that no rate is found from any rate retrieval processing job, for example because the shipment is too heavy based on third-party carrier specific rules, then no rate is returned.

Based on the rates returned from the rate retrieval process jobs, the user and/or server determines the final third-party carrier to use (304), and the server sends via an API call a request to the determined third-party carrier (210) to ship the shipment via that third-party carrier given the shipment details and requested service level. The third-party carrier (210) begins invoicing/billing and generates a shipping label (306) for the shipment in a computer format, for example PNG or PDF. In the case of an image computer format, the image is sent back to server (202) for storing for the user (308), who may then receive the image (310) for printing and shipping. In the case of a non-image format, the format is sent back to server (202) for storing (308) and rendering to the user (310) before printing and shipping.

Figure 3B:
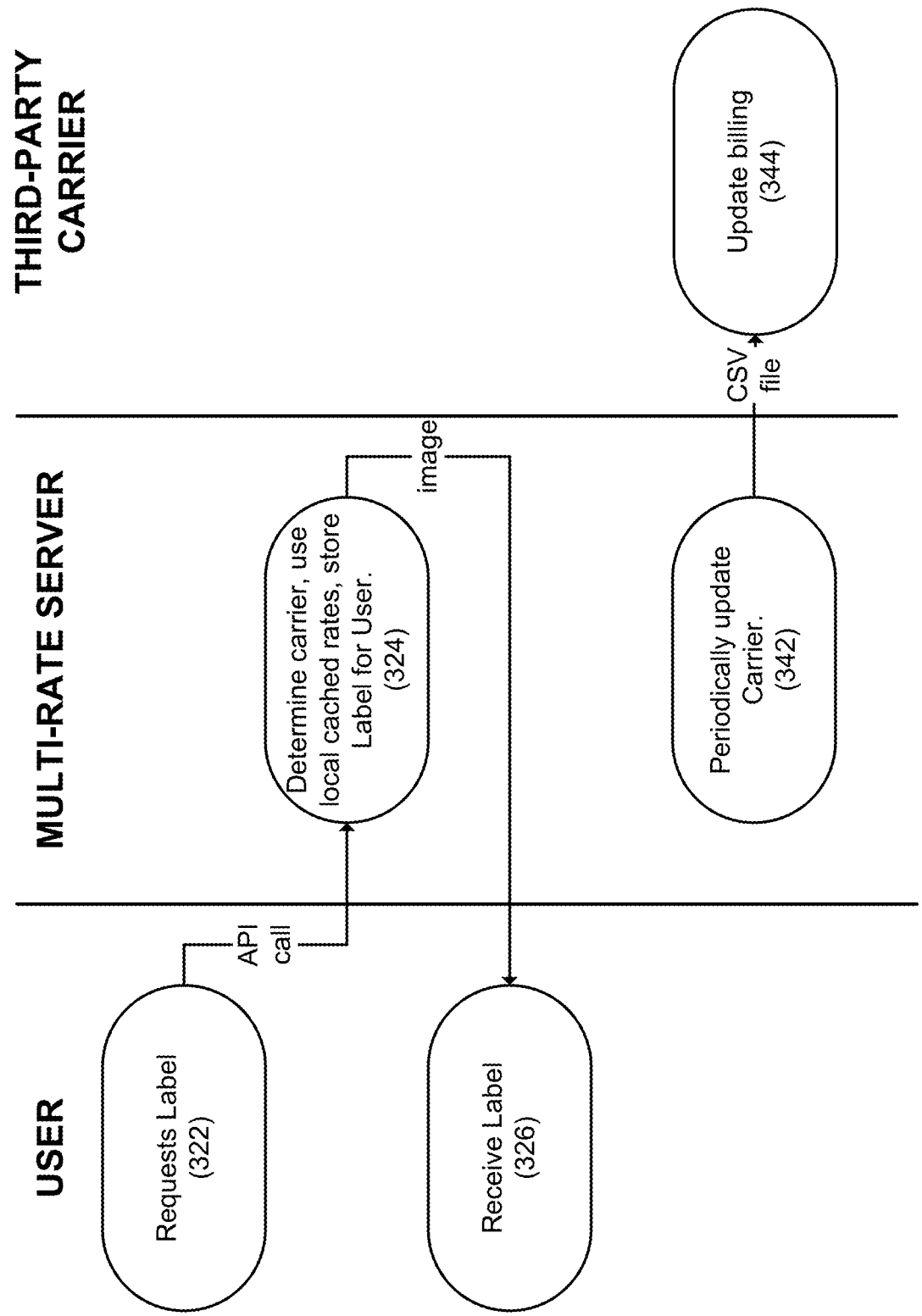
FIG. 3B is an illustration of an embodiment for a local workflow for a user.

FIG. 3B is an illustration of an embodiment for a local workflow for a user. In one embodiment, the workflow of FIG. 3B is orchestrated by shipping optimizer server (202) of FIG. 2A. What is meant by an 'local' workflow is that a projection of the third-party carrier rates on a local database (204) is used rather than an endpoint of the third-party carrier database (212).

Similar to stage (302) in the workflow in FIG. 3A, at stage (322) the user requests a label for shipment via an API call to server (202). For a third-party carrier that is indicated to be available for local workflow, the server then not only determines the carrier as was done in stage (304) in FIG. 3A, but also uses locally cached rates for each available third-party carrier for a rate retrieval process job (324), while also using endpoint rate retrieval process jobs for third-party carriers that are unavailable for local workflow. Based on the rates returned from the rate retrieval process jobs, the user and/or server determines the final third-party carrier to use (324) and if a third-party carrier with locally cached rates are used, the server (202) renders and stores a label for a user as well. In this case, the label is then received by the user (326) without the need for synchronous coupling and/or synchronous communication with the third-party carrier (210) during the requesting and receiving of the label.

Later, asynchronous to the workflow of stages (322) through (326), for example at the end of a day and/or periodically, the server (202) in stage (342) updates the third-party carrier (210) via an API call and/or DSV (delimiter-separated values) file transmittal, who in turn in stage (344) updates invoicing/billing for the determined account. In one embodiment, the DSV file includes an identifier assigned for each shipment such that the third-party carrier may retain a contact information for each shipment in the event of questions and/or feedback. In one embodiment, the DSV file transaction including billing amount is honored by the third-party carrier, even in the event of a rate change and/or other change would affect the rate costs.

Figure 4:
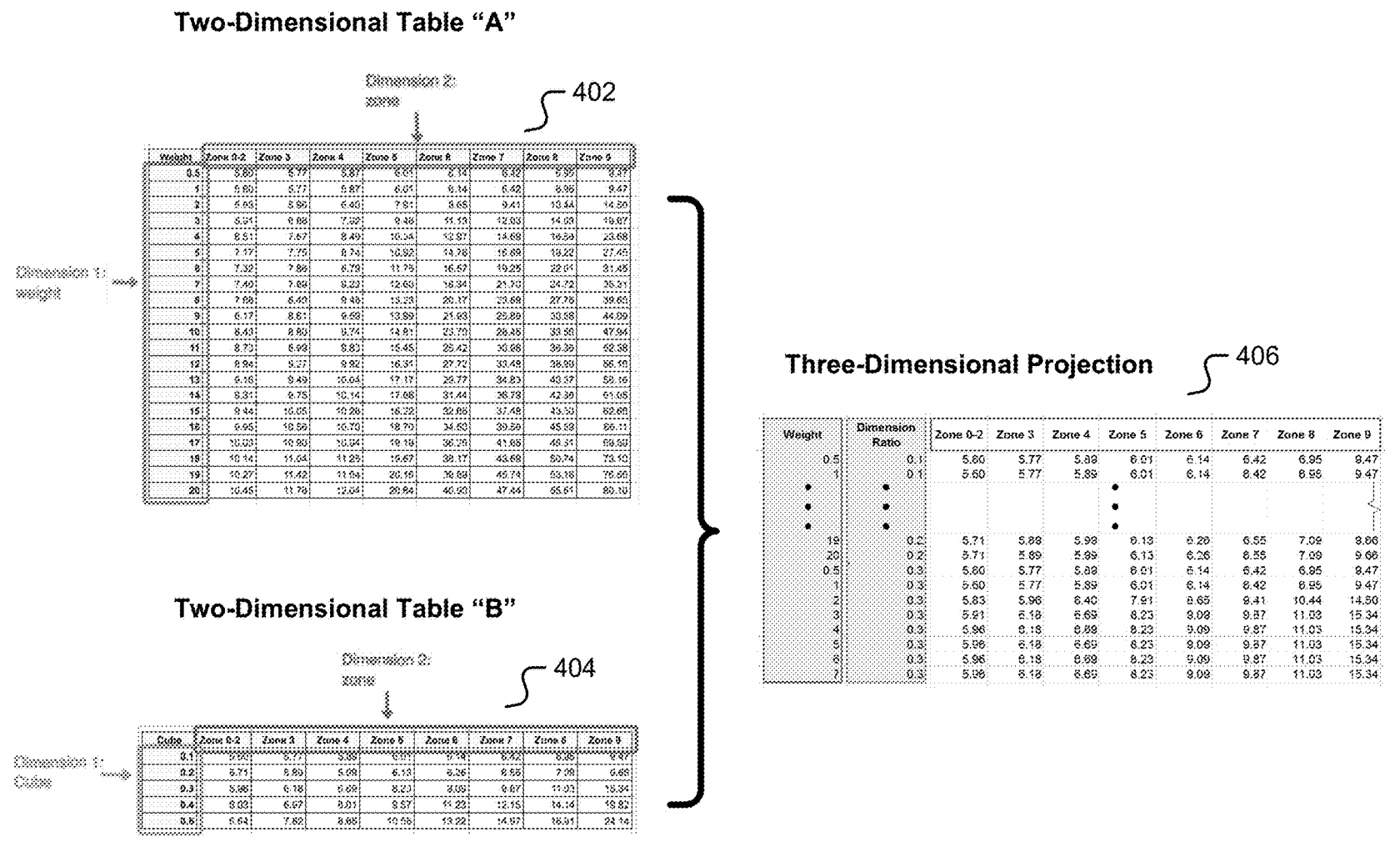

FIG. 4 is an illustration of an embodiment for a local projection of a third-party carrier rating. In one embodiment, a third-party carrier database includes two or more two-dimensional rate programs, with the example shown in FIG. 4 being a weight-zone (WZ) program (402) and a cubic program (404). The two-dimensional rate programs (402), (404) are termed 'two-dimensional' because they determine a rate cost as a function of two inputs; for WZ (402) rate cost is determined by a function of weight and zone, and for cubic (404) rate cost is determined by a function of package size and zone. Note that additional inputs are required to use this rate chart before these two inputs, for example if the rate chart is a USPS Priority Mail rate chart, it must be determined that: a USPS account is associated with the user; the USPS account is eligible for Priority mail (for example it is domestic US, it is less than 70 lbs, its package size does not exceed 120 inches in girth, and so on); and it does not use carrier-provided packaging.

The projection (406) is a "hybrid" cubic three-dimensional rate table based on WZ program (402) and cubic program (404). Storing a three-dimensional rate table instead of two separate two-dimensional rate tables has the following advantages:

There are an increased number of rate permutations, wherein a rate permutation is an entry in the rate table. For example, for the USPS WZ rate program (402) there are currently 168 rate permutations from 21 different weights and 8 different zones, and the USPS Cubic rate program (404) there are currently 40 rate permutations from 5 cubic sizes and 8 different zones. Thus there are 168+40=208 USPS rate permutations. For the hybrid cubic program (406) there are in total 21 weight rows×5 cube rows×8 zones=1,008 different rate permutations, or five times the USPS rate permutations;

While larger, the data structure is simpler and easier for comparison computations between the same third-party carrier or other third-party carriers. Instead of two look ups, a single look up is sufficient to compare rate costs; and A simpler data structure is also easier for normalization when comparing with other third-party carriers.

The advantages of more rate permutations are that by taking as many data points into account as possible in three dimensions rather than two dimensions, the user gets a better rate for a given shipment. With many more times the rate permutation, more selection results in more specific and thus less expensive rate costs. Equivalently, the more fine-grained pricing is for server (202), the better rates may be marked up without impacting a user as much. Any person having ordinary skill in the art will understand that while the examples below describe a three dimensional projection as an improvement over a two dimensional rate chart, without limitation the techniques disclosed may be applied to higher dimensions, for example a four dimensional projection for three dimensional rate charts.

For example, consider a 10 lb package with dimensions 10 in×5 in×5 in (cube 2) going to zone 6, shipped in May 2016. An applicable WZ price may be $23.70, while an applicable Cubic price may be $6.26. For someone without the three dimensional rate table (406), there are two choices: offer WZ with a large margin of $17.44, but the user would have to pay an expensive $23.70 rate; or offer Cubic with zero margin at $6.26, without any markup to server (202). With access to a hybrid cubic rate table, any price may be charged between $23.70 and $6.26 for the specific case of cube 2 and 10 lb, for example, charging $8.26 for the combination of cube 2 dimensions, 10 lb weight and zone 6 destination. This price beats those who charge based on WZ, but provides for a margin of $2.00 for the cube 2 and 10 lb combination. In one embodiment, the charge between $23.70 and $6.26 may be chosen over a gradient of differing cubes and weight to infer a pricing sensibility without an abrupt price hike when exceeding a specified cube and/or weight.

Another improvement for server (202) for either two-dimensional and three-dimensional rate charts is the use of "dimensional rounding". The server (202) intelligently parses rate charts with price breaks for weight, dimensions and zone. In one embodiment, the cheapest price is identified when the carrier rate charts have non-linear rates. For example, a scenario using Weight-Zone only for illustrative purposes is a customer with a Zone 8 shipment and a 2lb package. In this Weight-Zone chart the price for 2lb in Zone 8 is $10 whereas the price for 3lb in Zone 8 is $9. Rather than assuming the lower weight is cheapest and requesting a 2lb label from the carrier, the rate engine (202) parses the rate chart to determine 3lb is cheaper and requests a 3lb label from the carrier, thus saving $1 in shipping costs, as the carrier does not care whether a package is lighter than requested. This same example applies to all dimensions requesting "higher tier" rates across cube, weight, zones.

In terms of normalization, different third-party carriers use different dimensional and/or zone indices. For example a cubic index may be length×width×height in cubic inches. Another example may be a linear length of length+width+height. An example of a zone index may be the first three digits of a zip code, for example 945 includes all zip codes between 94501 and 94599. In one embodiment, heuristics, statistics, and/or analytics are used to normalize dimensional indices and/or zone indices between different third-party carriers.

Technical challenges overcome to accomplish three-dimensional projection (406) include:

The ability to rate shipments locally, without calling any API, as shown in FIG. 3B;

The local rating server/database (202)/(204) is able to take into account all third-party carrier rules to make sure the package is eligible for the corresponding rate programs and tiers;

The local rating is able to understand three rate chart dimensions—weight, cube and zone—and identify the cheapest price across multiple rate tiers and rate programs. Note the local rating also understands the other dimensions beyond the three rate chart dimensions such as account is associated with the user; the eligibility for a given service, carrier-provided packaging, and so on; and The local rating server is able to trace each rate back to the original third-party carrier rate tier and rate program. For example, it is not sufficient to simply find the cheapest rate in the three-dimensional rate chart (406), but the server (202) should identify which tier and which program the underlying rate is based on and correctly declare the package.

For example, the USPS as a third-party carrier does not understand a three-dimensional rate chart (406), so along with the request and reconciliation (342) the selected two-dimensional rate chart for each shipment, Cubic rate or WZ rate, must be indicated. In one embodiment, a shadow three-dimensional rate chart is generated that shows for a given rate permutation whether the given permutation is based on a Cubic rate or a WZ rate. The local rating server/database (202)/(204) parses the shadow chart to tell the label service whether to request a Cubic or a WZ label. In one embodiment, a way to determine whether a rate is based on WZ or Cubic is to check if in the underlying cost tier WZ or Cubic is less expensive.

Figure 5:
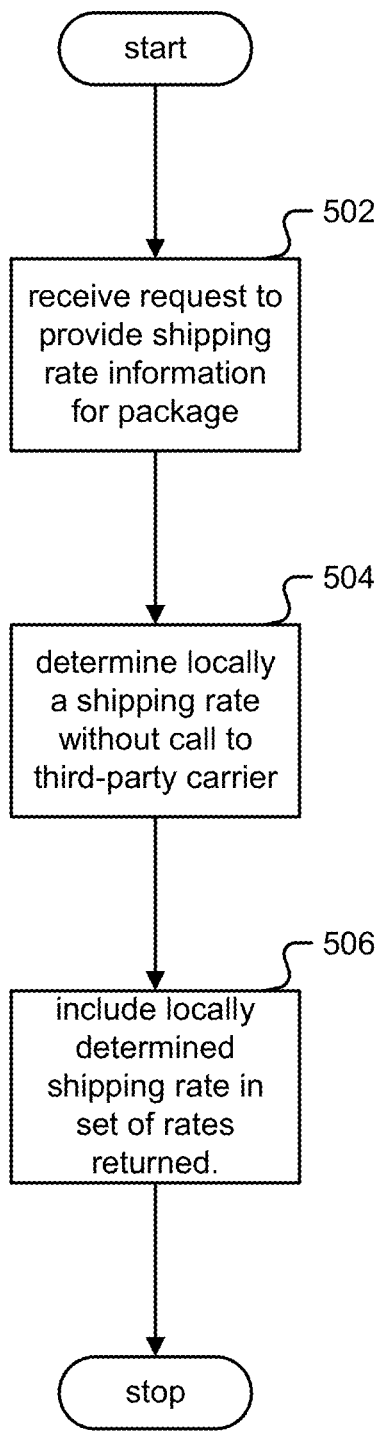
FIG. 5 is a flow chart illustrating an embodiment of a process for local projection rating.

FIG. 5 is a flow chart illustrating an embodiment of a process for local projection rating. In one embodiment, the process of FIG. 5 is performed by the server (202) and/or database (204) of FIG. 2A.

In step 502, a request is received to provide shipping rate information to ship a package from a source location to a destination location, for example from a user/node (208)/(206). In step 504, in response to the request of (502) a shipping rate to ship the package via a third-party carrier is determined locally, without making in response to the request a call to the third-party carrier. In one embodiment, determining the shipping rate locally is performed at least in part by: performing a look up from a locally stored data structure; by performing a computation such as a normalization computation and/or a comparison; and/or applying one or more carrier-specific rules.

In one embodiment, a locally stored data structure is a projection of an endpoint stored data structure stored in a third-party carrier rate database. In one embodiment, the projection permits dimensional rounding. In one embodiment, the projection is a three-dimensional representation of two or more two-dimensional endpoint stored data structures. In one embodiment, the projection is a dimension-normalized version of the endpoint stored data structure and/or a zone-normalized version of the endpoint stored data structure. In one embodiment, the projection comprises a shadow rate chart to determine which two-dimensional endpoint stored data structure is a base for a given rate permutation. In one embodiment, the shipping rate is determined locally as a fallback when an endpoint stored data structure results in poorer performance.

In one embodiment, the shipping rate is determined locally at least in part by considering at least one of the following: a rate tier; a third-party carrier account; and a rate table. In one embodiment, the rate table comprises at least one of the following: a third-party carrier; a service level of the third-party carrier; a set of rates for the service level of the third-party carrier comprising a set of indices, wherein the set of indices are based on at least one of the following: weight; physical dimension; and shipping zones; a set of service addenda of the third-party carrier; an effective date for the rate table; and an expiration date for the rate table.

In step 506, the locally determined shipping rate is included in a set of shipping rates returned to a node associated with the request. After step 506 (not shown in FIG. 5), a selection out of the set of shipping rates from a user/node associated with the request may be received. In one embodiment, a shipping label is provided to the user/node associated with the request based at least in part on the selection out of the set of shipping rates. In one embodiment, in the event the locally determined shipping rate is selected, a transaction reconciliation associated with the shipping label is uploaded to the third-party carrier after providing the shipping label to the user/node. In one embodiment, uploading the transaction reconciliation is not synchronously coupled to providing the shipping label. In one embodiment, the transaction reconciliation is a delimiter-separated values (DSV) file.

Figure 6:
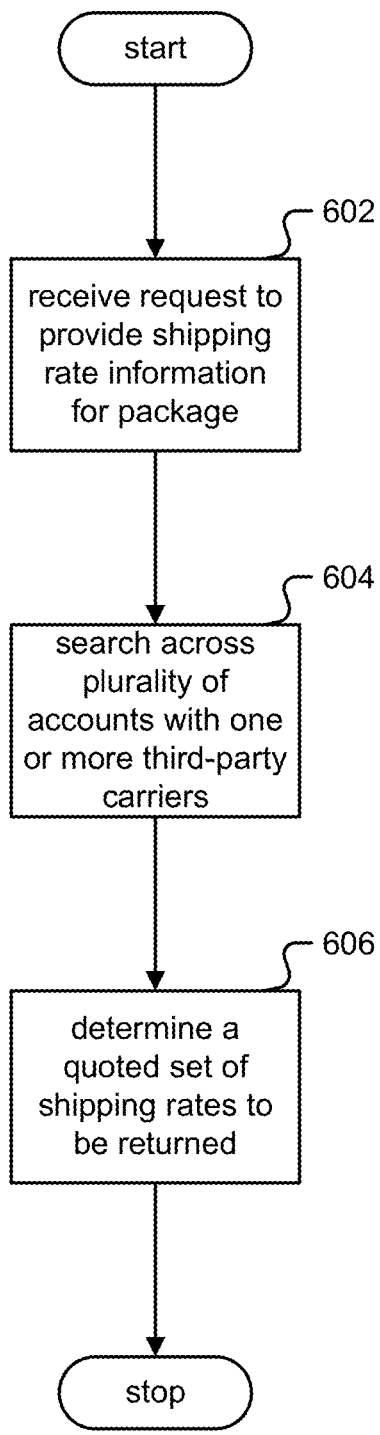
FIG. 6 is a flow chart illustrating an embodiment of a process for cross-account rating.

FIG. 6 is a flow chart illustrating an embodiment of a process for cross-account rating. In one embodiment, the process of FIG. 6 is performed by the server (202) and/or database (204) of FIG. 2A.

In step 602, a request is received to provide shipping rate information to ship a package from a source location to a destination location.

In step 604, a plurality of accounts with one or more third-party carriers are searched across to determine a set of shipping rates to ship the package. In one embodiment, the plurality of accounts include one or more accounts not associated specifically with a node associated with the request. In one embodiment, the node associated with the request is a user such as consumer (208) and/or e-commerce site (206). In one embodiment, the plurality of accounts include one or more accounts associated with the node associated with the request. An example of an account not associated specifically with the node associated with the request includes a server account, such as one associated with shipping optimizer server (202).

In one embodiment, searching across a plurality of accounts includes searching across a plurality of third-party carriers. In one embodiment, searching across a plurality of accounts includes determining a third-party carrier and shipping service type available given details of the request. For example, details of the request may include at least one of the following: weight index; physical dimension index; and shipping zone index.

In one embodiment, the plurality of accounts includes a first account with a specific third-party carrier, for example a USPS First Class account, and a second account with the specific third-party carrier, for example a USPS Priority Mail account, wherein both first account and second account are associated with the node (208)/(206), and wherein the first account and second account are associated with different rate tables. In one embodiment, the search occurs by commissioning a first rate retrieval processing job with the first account and commissioning a second rate retrieval processing job with the second account.

In one embodiment, the plurality of accounts includes a first account with a specific third-party carrier, for example a USPS Priority Mail account, and a second account with the specific third-party carrier, for example another USPS Priority Mail account, wherein the first account is associated with a server and the second account is associated with the node.

In one embodiment, the plurality of accounts includes a first account with a specific third-party carrier, for example a USPS First Class account, and a second account with the specific third-party carrier, for example a USPS Priority Mail account, wherein both first account and second account are associated with the server (202), and wherein the first account and second account are associated with different rate tables. In one embodiment, no rates are returned in response to the request in the event that no suitable shipping rates are determined.

In one embodiment, a shipping rate is determined at least in part by considering at least one of the following: a rate tier; a third-party carrier account; and a rate table. In one embodiment, a given rate table comprises at least one of the following: a third-party carrier; a service level of the third-party carrier; a set of rates for the service level of the third-party carrier comprising a set of indices, wherein the set of indices are based on at least one of the following: weight; physical dimension; and shipping zones; a set of service addenda of the third-party carrier; an effective date for the rate table; and an expiration date for the rate table.

In step 606, a quoted set of shipping rates is determined from the set of shipping rates to be returned in response to the request. In one embodiment, the quoted set includes for each shipping service type of a given third-party carrier at most one quoted shipping rate. In one embodiment, the quoted set of shipping rates includes one or more shipping rates. In one embodiment, in the event there are two or more shipping rates in the set of shipping rates, at least one of the following is selected: a lowest cost to the node; a lowest cost to a server associated with the server account; and a highest margin to the server. In one embodiment, determining a quoted set of shipping rates includes checking two or more rate tables and returning only a single shipping rate, for example a shipping rate of lowest cost to the node. In one embodiment, the two or more rate tables are each two-dimensional rate tables, for example a WZ table and a Cubic table. In one embodiment, the two or more two-dimensional rate tables are used to populate a three-dimensional rate table, for example a hybrid cubic table.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  a communication interface; and a processor coupled to the communication interface and configured to:
  receive via the communication interface an application programming interface (API) request to provide shipping rate information to ship a package from a source location to a destination location;
  search across a plurality of accounts with one or more third-party carriers to determine a set of shipping rates to ship the package;
  wherein the API request is associated with a user, and the user is associated with a user account for a given third-party carrier, and the user account is associated with a volume requirement;
  wherein the plurality of accounts comprises the user account;
  wherein the plurality of accounts comprises a server account for the given third-party carrier;
  wherein the server account is not associated specifically with the user;
  wherein the searching across the plurality of accounts comprises:
    determining locally, from a locally stored data structure, the set of shipping rates without making a call to the given third-party carrier, the locally stored data structure including a rate table, the rate table including a locally cached set of rates including a plurality of rate tiers for the given third-party carrier, the plurality of rate tiers relating to a projection based on a weight-zone program and a cubic program, wherein in the event that a first shipping rate for a tier for a carrier/service combination for a user does not exist, the tier for the carrier/service combination inherits a second shipping rate from a higher level tier for the carrier/service combination;
  determine a quoted set of shipping rates from the set of shipping rates to be returned as an API response to the request, comprising to:
    determine whether a first shipping rate for the package is less than a second shipping rate for the package, wherein the first shipping rate for a first weight of the package is less than the second shipping rate for a second weight of the package by parsing the rate table or the first shipping rate of a first cubic dimension of the package is less than the second shipping rate for a second cubic dimension of the package for the same zone by parsing the rate table, wherein the first weight is heavier than the second weight, and wherein the first cubic dimension is larger than the second cubic dimension; and
    in response to a determination that the first shipping rate is less than the second shipping rate, select the first shipping rate to be included in the quoted set of shipping rates; and
  transmit via API a shipping label based at least in part on a locally determined one shipping rate of the quoted set of shipping rates, comprising to:
    obtain an updated set of shipping rates from a third-party carrier;
    determine whether the locally determined one shipping rate differs from a corresponding updated shipping rate of the updated set of shipping rates; and
    in response to a determination that the locally determined one shipping rate differs from the corresponding updated shipping rate of the updated set of shipping rates, upload a transaction reconciliation associated with the shipping label to the third-party carrier after providing the shipping label.

2. The system recited in claim 1, wherein the plurality of accounts include one or more accounts not associated specifically with a node associated with the request.

3. The system recited in claim 2, wherein the plurality of accounts include one or more accounts associated with the node associated with the request.

4. The system recited in claim 1, wherein an account not associated specifically with a node associated with the request includes a server account.

5. The system recited in claim 1, wherein the quoted set of shipping rates includes one or more shipping rates.

6. The system recited in claim 1, wherein the quoted set includes for each shipping service type of a given third-party carrier at most one quoted shipping rate.

7. The system recited in claim 6, wherein the processor determines a quoted set of shipping rates includes, in the event there are two or more shipping rates in the set of shipping rates, selecting at least one of the following: a lowest cost to the node; a lowest cost to a server associated with the server account; and a highest margin to the server.

8. The system recited in claim 1, wherein the processor searches across a plurality of accounts includes searching across a plurality of third-party carriers.

9. The system recited in claim 1, wherein the processor searches across a plurality of accounts includes determining the third-party carrier and shipping service type available given details of the request.

10. The system recited in claim 1, wherein the plurality of accounts includes a first account with a specific third-party carrier and a second account with the specific third-party carrier, wherein both first account and second account are associated with the node, and wherein the first account and second account are associated with different rate tables.

11. The system recited in claim 10, wherein the processor searches by commissioning a first rate retrieval processing job with the first account and commissioning a second rate retrieval processing job with the second account.

12. The system recited in claim 1, wherein the plurality of accounts includes a first account with a specific third-party carrier and a second account with the specific third-party carrier, wherein the first account is associated with a server and the second account is associated with the node.

13. The system recited in claim 1, wherein the plurality of accounts includes a first account with a specific third-party carrier and a second account with the specific third-party carrier, wherein both first account and second account are associated with a server, and wherein the first account and second account are associated with different rate tables.

14. The system recited in claim 1, wherein the processor returns no rates in response to the request in the event that no suitable shipping rates are determined.

15. The system of claim 1, wherein the rate table comprises at least one of the following: the third-party carrier; a service level of the third-party carrier; a set of rates for the service level of the third-party carrier comprising a set of indices, wherein the set of indices are based on at least one of the following: a set of service addenda of the third-party carrier; an effective date for the rate table; and an expiration date for the rate table.

16. A method, comprising:
  receiving via a communication interface an application programming interface (API) request to provide shipping rate information to ship a package from a source location to a destination location;

searching across a plurality of accounts with one or more third-party carriers to determine a set of shipping rates to ship the package;

wherein the API request is associated with a user, and the user is associated with a user account for a given third-party carrier, and the user account is associated with a volume requirement;

wherein the plurality of accounts comprises the user account;

wherein the plurality of accounts comprises a server account for the given third-party carrier;

wherein the server account is not associated specifically with the user;

wherein the searching across the plurality of accounts comprises:

determining locally, from a locally stored data structure, the set of shipping rates without making a call to the given third-party carrier, the locally stored data structure including a rate table, the rate table including a locally cached set of rates including a plurality of rate tiers for the given third-party carrier, the plurality of rate tiers relating to a projection based on a weight-zone program and a cubic program, wherein in the event that a first shipping rate for a tier for a carrier/service combination for a user does not exist, the tier for the carrier/service combination inherits a second shipping rate from a higher level tier for the carrier/service combination;

determining a quoted set of shipping rates from the set of shipping rates to be returned as an API response to the request, comprising:

determining whether a first shipping rate for the package is less than a second shipping rate for the package, wherein the first shipping rate for a first weight of the package is less than the second shipping rate for a second weight of the package by parsing the rate table or the first shipping rate of a first cubic dimension of the package is less than the second shipping rate for a second cubic dimension of the package for the same zone by parsing the rate table, wherein the first weight is heavier than the second weight, and wherein the first cubic dimension is larger than the second cubic dimension; and in response to a determination that the first shipping rate is less than the second shipping rate, selecting the first shipping rate to be included in the quoted set of shipping rates; and transmitting via API a shipping label based at least in part on a locally determined one shipping rate of the quoted set of shipping rates, comprising:

obtaining an updated set of shipping rates from a third-party carrier;

determining whether the locally determined one shipping rate differs from a corresponding updated shipping rate of the updated set of shipping rates; and in response to a determination that the locally determined one shipping rate differs from the corresponding updated shipping rate of the updated set of shipping rates, uploading a transaction reconciliation associated with the shipping label to the third-party carrier after providing the shipping label.

17. A computer program product, the computer program product being embodied in a non-transitory computer readable storage medium and comprising computer instructions for:

receiving an application programming interface (API) request to provide shipping rate information to ship a package from a source location to a destination location;

searching across a plurality of accounts with one or more third-party carriers to determine a set of shipping rates to ship the package;

wherein the API request is associated with a user, and the user is associated with a user account for a given third-party carrier, and the user account is associated with a volume requirement;

wherein the plurality of accounts comprises the user account;

wherein the plurality of accounts comprises a server account for the given third-party carrier;

wherein the server account is not associated specifically with the user;

wherein the searching across the plurality of accounts comprises:

determining locally, from a locally stored data structure, the set of shipping rates without making a call to the given third-party carrier, the locally stored data structure including a rate table, the rate table including a locally cached set of rates including a plurality of rate tiers for the given third-party carrier, the plurality of rate tiers relating to a projection based on a weight-zone program and a cubic program, wherein in the event that a first shipping rate for a tier for a carrier/service combination for a user does not exist, the tier for the carrier/service combination inherits a second shipping rate from a higher level tier for the carrier/service combination;

determining a quoted set of shipping rates from the set of shipping rates to be returned as an API response to the request, comprising:

determining whether a first shipping rate for the package is less than a second shipping rate for the package, wherein the first shipping rate for a first weight of the package is less than the second shipping rate for a second weight of the package by parsing the rate table or the first shipping rate of a first cubic dimension of the package is less than the second shipping rate for a second cubic dimension of the package for the same zone by parsing the rate table, wherein the first weight is heavier than the second weight, and wherein the first cubic dimension is larger than the second cubic dimension; and in response to a determination that the first shipping rate is less than the second shipping rate, selecting the first shipping rate to be included in the quoted set of shipping rates; and transmitting via API a shipping label based at least in part on a locally determined one shipping rate of the quoted set of shipping rates, comprising:

obtaining an updated set of shipping rates from a third-party carrier;

determining whether the locally determined one shipping rate differs from a corresponding updated shipping rate of the updated set of shipping rates; and in response to a determination that the locally determined one shipping rate differs from the corresponding updated shipping rate of the updated set of shipping rates, uploading a transaction reconciliation associated with the shipping label to the third-party carrier after providing the shipping label.

\* \* \* \* \*

UNITED STATES PATENT AND TRADEMARK OFFICE
CERTIFICATE OF CORRECTION

| | | |
|---|---|---|
| PATENT NO. | : 11,301,801 B1 | |
| APPLICATION NO. | : 15/424776 | |
| DATED | : April 12, 2022 | |
| INVENTOR(S) | : Simon Kreuz et al. | |

It is certified that error appears in the above-identified patent and that said Letters Patent is hereby corrected as shown below:

On the Title Page

Column 2, Item (56), other publications, cite No. 1, delete ""2019 (Year: 2019)" and insert --(Year: 2019)--, therefor.

In the Specification

In Column 5, Line(s) 60, after "the", delete "struck through".
In Column 9, Line(s) 54, delete "and" and insert --or--, therefor.
In Column 9, Line(s) 60, delete "21b" and insert --2 lb--, therefor.
In Column 9, Line(s) 61, delete "21b" and insert --2 lb--, therefor.
In Column 9, Line(s) 62, delete "31b" and insert --3 lb--, therefor.
In Column 9, Line(s) 64, delete "21b" and insert --2 lb--, therefor.
In Column 9, Line(s) 65, delete "31b" and insert --3 lb--, therefor.
In Column 9, Line(s) 65, delete "31b" and insert --3 lb--, therefor.

Signed and Sealed this
Twenty-sixth Day of July, 2022

Katherine Kelly Vidal
*Director of the United States Patent and Trademark Office*